United States Patent [19]

Bowen et al.

[11] Patent Number: 4,922,079

[45] Date of Patent: May 1, 1990

[54] COMBINATION COOKING CARTRIDGE

[75] Inventors: Robert F. Bowen, Burlington; Joseph C. Maiellano, Jr., Chelmsford, both of Mass.

[73] Assignee: Raytheon Company, Lexington, Mass.

[21] Appl. No.: 407,673

[22] Filed: Sep. 13, 1989

Related U.S. Application Data

[63] Continuation of Ser. No. 170,195, Mar. 18, 1988, abandoned.

[51] Int. Cl.$^5$ ............................................. F24C 15/18
[52] U.S. Cl. ..................................... 219/415; 219/432
[58] Field of Search ............... 219/415, 416, 417, 418, 219/419, 432, 433, 401, 405, 411, 354, 441, 439; 126/369, 20

[56] References Cited

U.S. PATENT DOCUMENTS

| | | | |
|---|---|---|---|
| 1,378,566 | 5/1921 | Shroyer | 219/415 |
| 1,383,971 | 7/1921 | Biette | 126/369 |
| 1,415,049 | 5/1922 | Reichart | 219/415 |
| 1,485,292 | 2/1924 | Popper | 126/20 |
| 1,550,707 | 8/1925 | Moore | 219/416 |
| 2,182,682 | 12/1939 | Shroyer | 219/407 |
| 2,187,888 | 1/1940 | Nachumsohn . | |
| 2,329,760 | 9/1943 | Heilman | 219/415 |
| 2,695,352 | 11/1954 | Dekold | 219/415 |
| 2,695,947 | 11/1954 | Heerdt | 219/417 |
| 2,715,898 | 9/1951 | Michaelis et al. . | |
| 2,831,956 | 4/1953 | Fry . | |
| 3,364,844 | 1/1968 | Felske | 219/441 |
| 3,443,063 | 5/1969 | Berger | 219/415 |
| 3,641,926 | 2/1972 | Williams | 219/430 |
| 3,869,595 | 3/1975 | Collins | 219/439 |

FOREIGN PATENT DOCUMENTS

| | | | |
|---|---|---|---|
| 733201 | 4/1966 | Canada | 219/385 |
| 870647 | 3/1942 | France | 219/415 |
| 984491 | 7/1951 | France | 219/415 |
| 1026817 | 5/1953 | France | 219/415 |
| 2416427 | 4/1978 | France . | |
| 2185876 | 8/1987 | United Kingdom . | |

OTHER PUBLICATIONS

Jenn-Air Quality Appliances for Distinctive Kitchens; Jenn-Air Company, Indiana; Jul. 1987.

Primary Examiner—Teresa J. Walberg
Attorney, Agent, or Firm—William R. Clark; Richard M. Sharkansky; Steven C. Stewart

[57] ABSTRACT

A combination bake oven/steamer/broiler cartridge for cooking food on a cooktop. A heat source is placed on a pan within a cooktop frame. A cartridge is placed over the heat source and inserted into the pan. The heating device warms the cartridge. The cartridge can be selectively configured as a bake oven, steamer or broiler. To configure a bake oven, an adjustable rack is placed in the cartridge to hold the food. A cover is then placed over the cartridge to contain heat. To configure a steamer, water is added to the bottom of the cartridge. A steaming pan is then placed in the cartridge. The cartridge is then covered. The water is then heated to make steam. By substituting a ceramic or glass container for the steaming pan, the steamer functions as a warming device. To configure a broiler, a special cover containing heating elements is placed over the adjustable rack.

19 Claims, 7 Drawing Sheets

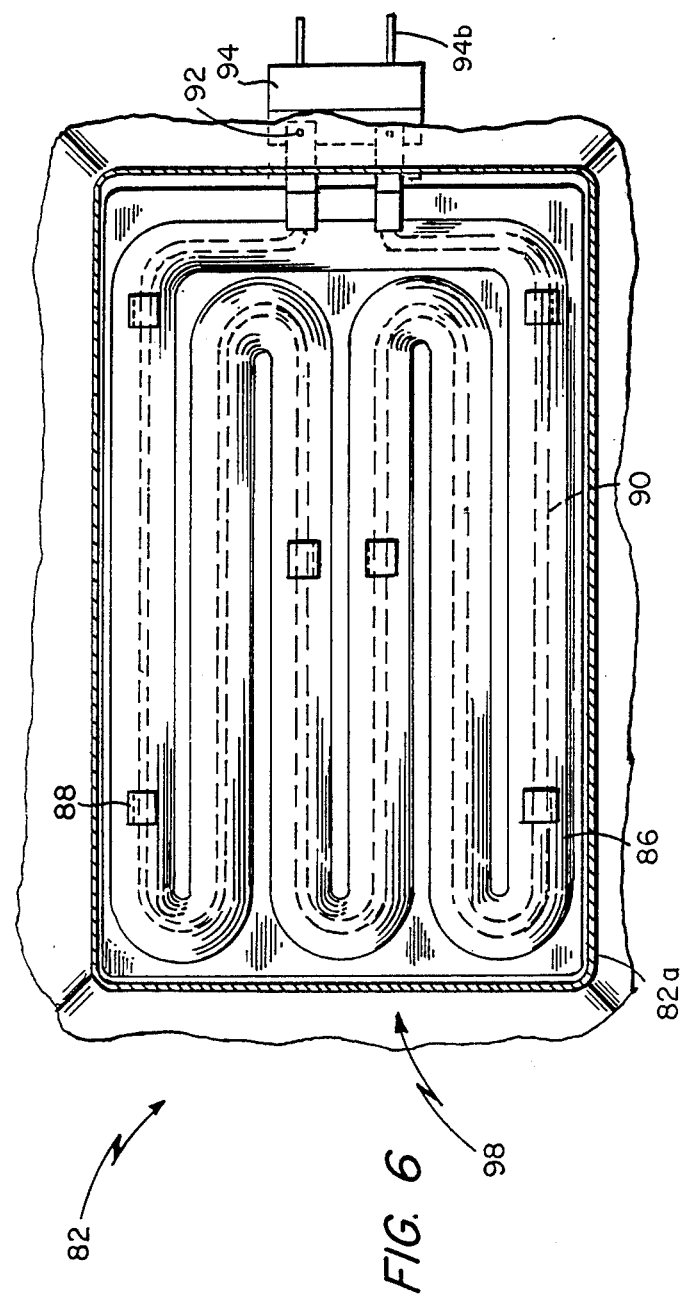

COMBINATION COOKING CARTRIDGE

This application is a continuation of application Ser. No. 170,195, filed Mar. 18, 1988, now abandoned.

BACKGROUND OF THE INVENTION

The invention relates generally to a combination bake oven/steamer/broiler/warmer and more particularly to electric cooking in a cartridge cooktop. As known in the art, one type of cooking device includes electric cartridge cooking. An electric cartridge cooktop provides a cooking device that is mounted on the top of a counter. An electric cartridge cooktop such as Caloric Co. Model No. EDR648 allows interchangeable cooktop accessories within a cooktop frame. Some of the cooktop accessories available that can be plugged into a cooktop frame are a grill, a griddle, a rotisserie, ceramic glass and electric heating elements. These accessories require that food be cooked above the cooktop surface to avoid excess buildup of heat within the counter and under the cooking utensil. Further, these cooktop accessories generate heat to the cooktop surrounding area.

As is also known in the art, another type of cooking device is a steamer. Steamers provide a method of cooking food to lock in nutrients in vegetables. Steaming is performed by placing food into a container a layer of water container is placed above a pan containing a layer of water on the bottom of the pan. The water is brought to a boil by a heating element on the top of the stove. The boiling water produces steam which seeps into the holes in the container and cooks the food. Steamers that are used in stove top cooking have a high profile which makes visibility of the food while cooking more difficult.

Another device used to cook food is a baker. A baker contains a bounded insulated cavity with a heating device located in the cavity. The cavity will also contain a rack in which food is held during cooking. The rack allows regulation of the distance of the food from the heat source. Bakers or ovens are built into walls or may be freestanding. However, bakers do not permit easy access by cover removal. Further, bakers allow easy removal of the walls of the cavity for cleaning. Also, stirring or basting food within bakers is more difficult without removal of the food from the baking compartment.

Another device used to heat food is a plate warmer or double boiler. A double boiler is made up of two pans. The first pan contains water and is placed over the heat source. The second pan is inserted into the first pan. The water is then heated, which then boils and heats the second pan. By constructing the pans in the double boiler configuration, food can be placed into the second pan and kept warm at a constant temperature. Further, this configuration keeps the second pan warm without burning as the temperature of the second pan is limited to the boiling point of water.

Household double boilers are typically placed on the top of the stove. The double boiler first pan is heated with a stove top heating element. The stove top double boiler provides a high profile which makes visibility of the food being warmed more difficult. In addition, the bottom of the first pan of a stove top double boiler typically has small surface area. This small surface area results in the water on the bottom of the first pan reaching the boiling point at a slower rate. Double boilers can also melt, burn or crack when they run out of water due to the closeness of the heater to the first pan.

As is known in the art, another device used in cooking food is a broiler. A broiler works by placing food in a pan. The pan is then placed on a shelf in a stove or oven cavity with a heat source located near the top of the oven cavity. The shelf is adjusted to place the food near the heat source.

Broiling cooks food on one side at a time. To cook the second side, the food must be removed from the oven, flipped and placed back under the broiler. The food must also be removed to observe the cooking process. To remove the pan with the food from the oven, the cook must use a heat protective mit. The cook can be harmed by touching the hot pan when removing the pan.

SUMMARY OF THE INVENTION

It is therefore an objective of this invention to provide an improved countertop cooking device.

It is another object of this invention to provide countertop bake oven apparatus that can be plugged into a cooktop frame.

It is another object of this invention to provide a low profile steamer that can be plugged into a cooktop frame.

It is another object of this invention to provide a countertop steam warmer apparatus that can be plugged into a cooktop frame.

It is another object of this invention to provide a countertop broiler apparatus that can be plugged into a cooktop frame.

It is another objective of this invention to provide an apparatus that prevents excess heat from building up under a bake oven/steamer in a cooktop frame.

It is another object of this invention to provide an apparatus that reduces excess heat from being dissipated to the user from the bake oven/steamer/warmer in a cooktop frame.

It is another objective of this invention to provide an apparatus that permits easy access by cover removal to the cook in a bake oven plugged into a cooktop frame.

It is another object of this invention to provide an apparatus that permits easy visibility to food being cooked in a double boiler which is plugged into a countertop frame.

It is another object of this invention to provide an apparatus to warm food in a double boiler that heats up quickly.

It is another object of this invention to provide an apparatus that broils food which allows the food to be flipped without removing the pan on which the food resides from the apparatus.

These and other objects of the invention are attained generally by providing an apparatus for cooking food comprising a counter cooktop frame having a top surface with an aperture formed therein. Also provided is a second pan having a floor, being disposed within said aperture and being supported by the counter cooktop frame, wherein the level of the floor is below the level of the top surface. A heat source is supported by the second pan, a first pan having a floor and a plurality of walls forming a cavity therein, the first pan being supported by the second pan wherein the cavity of the first pan is heated by the heat source. The apparatus further comprises means supported by the first pan for supporting food in an elevated position, and means for covering the first pan to contain heat generated by the heat source. It is preferable that the apparatus further comprise a groove means between the second pan and the first pan for allowing hot air to circulate around the perimeter of the first pan to prevent the buildup of heat below the first pan. It is also preferable that the food supporting means has a rack with a plurality of horizontal bars and means for supporting the rack in an elevated position. It may also be preferable that the heat source is an electrically resistive heating element. Alternately, the food supporting means of the apparatus may comprise a container coupled to the walls of the first pan. The first pan may further comprise a means for holding water wherein the water generates steam in response to the first pan being heated, thereby warming the container and any food therein. Further, the first pan of the apparatus may comprise means for holding water wherein the water generates steam in response to said first pan being heated, and the sides of the container have a plurality of holes whereby food disposed within the container is steamed through the holes.

BRIEF DESCRIPTION OF THE DRAWINGS

The above and other objects of the invention will become better understood by reference to the following description taken together in conjunction with the accompanying drawings, in which:

FIG. 6 is a top isometric view of the broiler cover shown in FIG. 6, such view taken along line 6—6 in such FIG. 5;

DESCRIPTION OF THE PREFERRED EMBODIMENT

Figure 1:
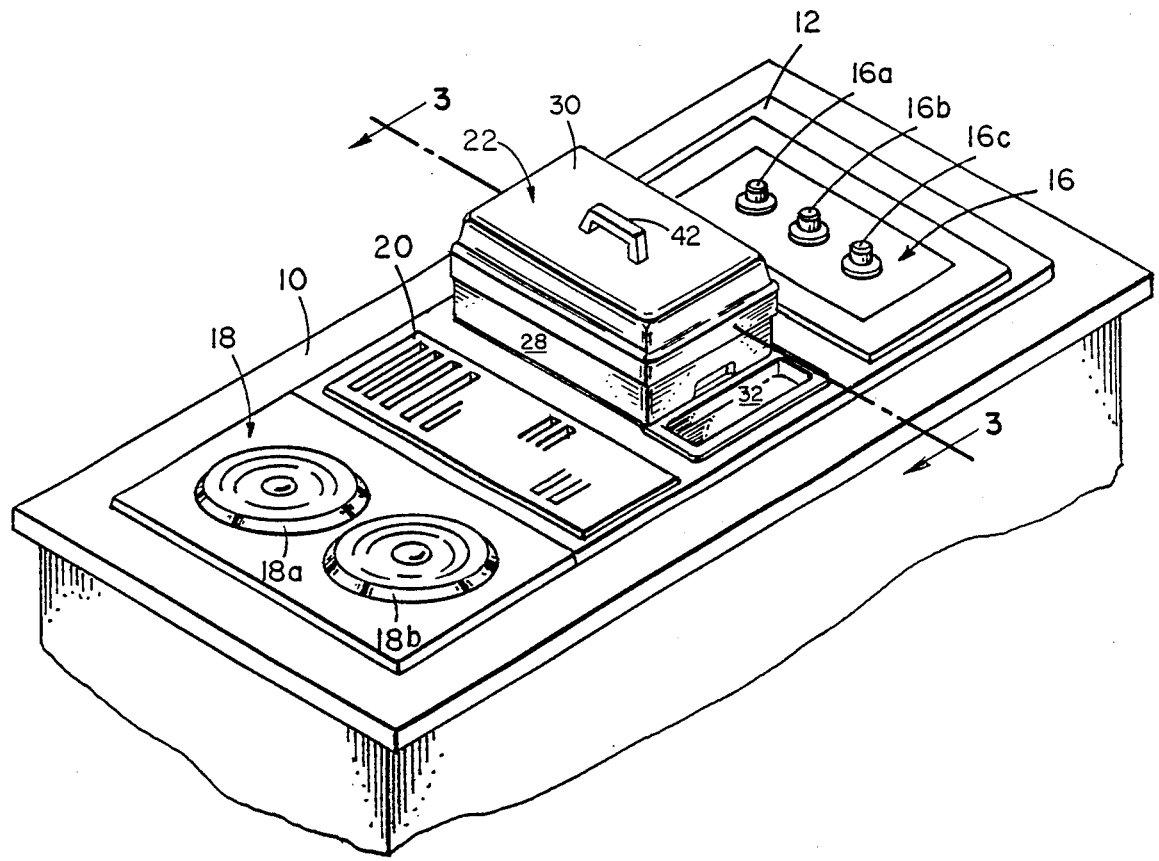
FIG. 1 is a top perspective view, showing the combination cooking cartridge mounted on a counter.

Referring to FIG. 1, shown is a counter 10 containing a cooktop frame 12. A portion of counter 10 is contoured to the shape of the cooktop frame 12. The cooktop frame 12 is inserted and then screwed into the counter 10. Cooktop frame 12 has four elements: a heating element cartridge 18, a control panel 16, a downdraft ventilation system 20 and a combination bake oven/steamer/broiler or cooking cartridge 22. Both heating element cartridge 18 and combination cooking cartridge 22 are insertable and removable from cooktop frame 12. Heating element cartridge 18 contains stove top heating elements 18a and 18b. The control panel 16 is shown with control knobs 16a, 16b and 16c. Control knobs 16a and 16b enable power to stove top heating elements 18a and 18b, respectively. Control knob 16c provides power to combination cooking cartridge 22.

Ventilation system 20 provides a downdraft ventilation system to remove any smoke, heat or steam generated by food cooking on stove top heating elements 18a and 18b or from combination cartridge 22. More detail of downdraft operation will be explained later.

Figure 2:
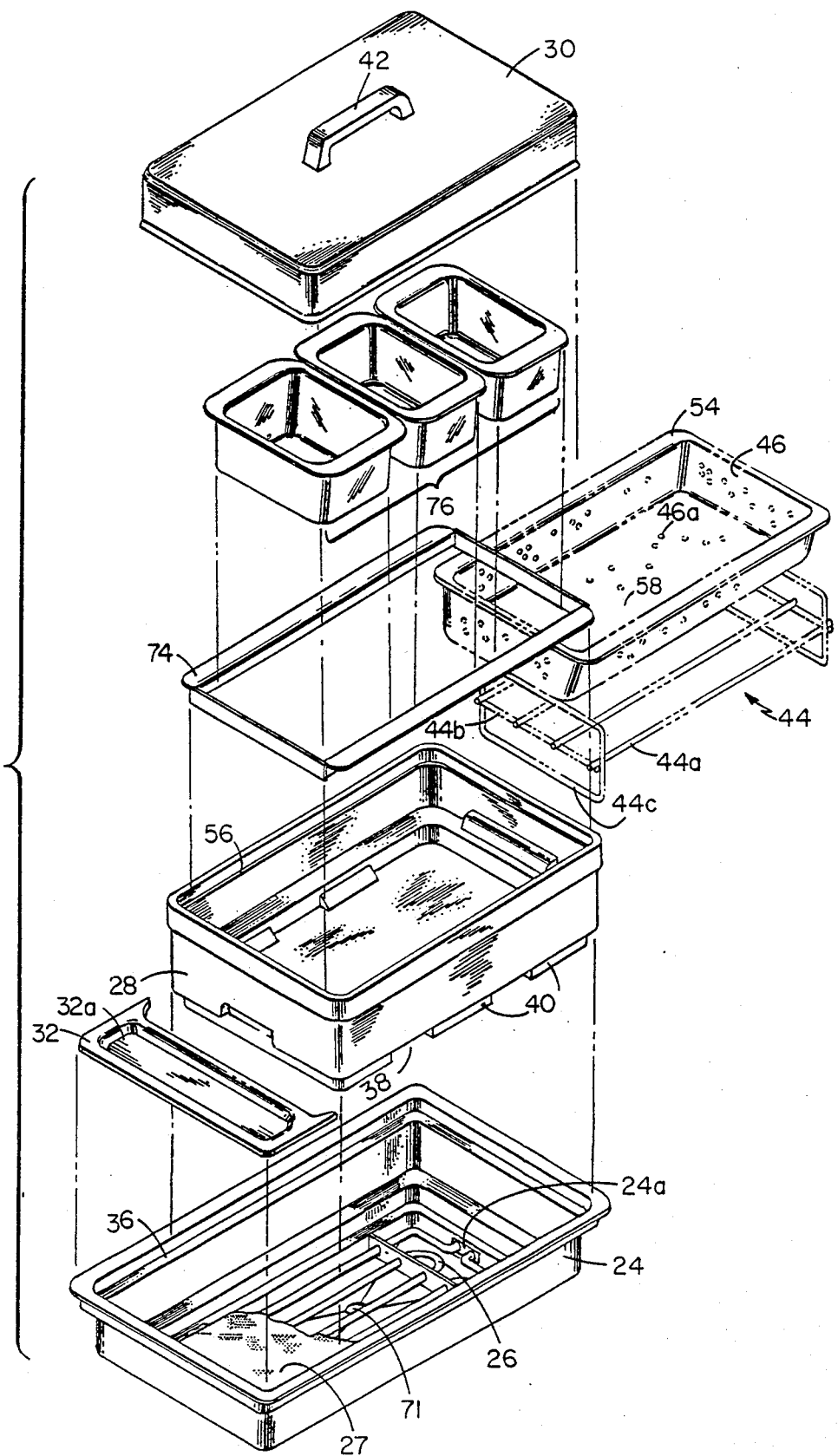
FIG. 2 is an exploded perspective view, showing a bake oven, steamer and warmer cartridge according to our invention.
Figure 3:
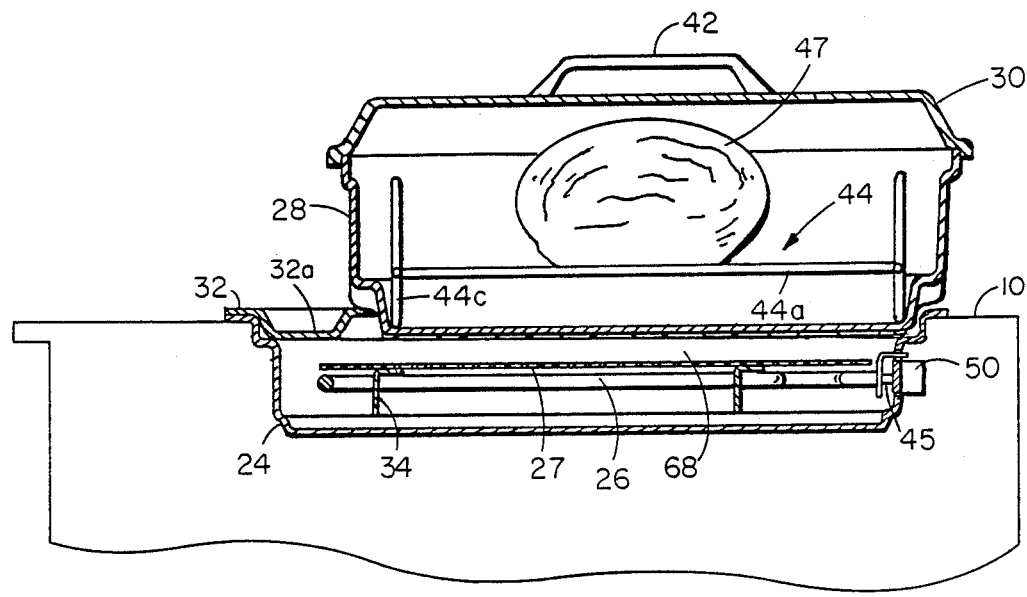
FIG. 3 is a side cross-sectional view of the counter and a bake oven of the combination cooking cartridge shown in FIG. 1.
Figure 4:
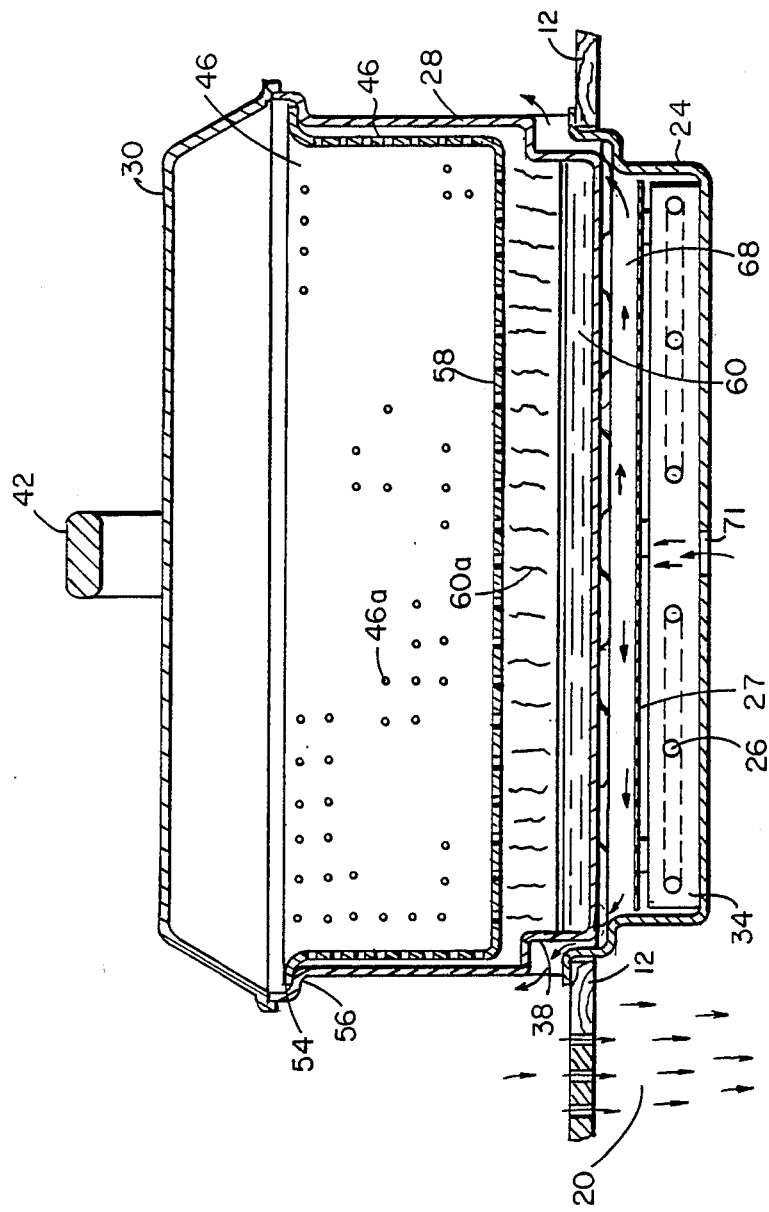
FIG. 4 is a side cross-sectional view of the downdraft air vent and steamer embodiment of the combination cooking cartridge shown in FIG. 1.

Referring to FIG. 2–FIG. 4, combination cooking cartridge 22 includes a bottom or second pan 24, an electric resistive heating element 26, a cook'n serve vessel or first pan 28, a cover 30 and a melting tray 32.

The second pan 24 is inserted into counter 10. The floor of second pan 24 is rectangularly shaped and made from a metal material. Cut out of the center of second pan 24 is hole 71. Mounted to the bottom of second pan 24 is heating element 26. Heating element 26 is constructed with a flat CALROD and shaped into a snake-like pattern. Heating element 26 is secured to second pan 24 with bracket 34. Heating element 26 pertrudes through hole 24a in the back of second pan 24 and makes contact with a plug 50 (FIG. 3). Resting on top of heating element 26 and also connected to bracket 34 is sheet 27. Sheet 27 is constructed from a heat conducting material and contains a plurality of perforations. Sheet 27 allows heating element 26 to dissipate heat more evenly to second pan 24.

First pan 28 rests on ridge 36 in second pan 24. First pan 28 floor is also shaped in a rectangular pattern. Along the top inner edge of first pan 28 is shelf 56. Further, first pan 28 has a groove 38 and ridges 40 along its bottom outside perimeter. The combination of grooves 38 and ridges 40 allow air to circulate through second pan 24. First pan 28 may be constructed from either a metal material, such as formed steel, to provide a fast cooking device or a ceramic material such as silverstone, earthware or pyrex to provide a slow cooking device.

The lid or cover 30 rests on top of first pan 28. The cover 30 is shaped to conform with the top edge surface of first pan 28. The cover 30 is sloped along its outer edges to allow moisture that collects on cover 30 to drip downward into the first pan 28 below. Cover 30 may be constructed from an earthware, pyrex or formulated steel. Further, cover 30 may also have an enamel coating. Connected to the top of cover 30 is an insulated handle 42 to allow easy removal.

Melting tray 32 rests on the upper edge of second pan 24. Melting tray 32 has a rectangular shaped outer edge with a rectangular trough 32a formed therein. Melting tray 32 is used to hold various cooking utensils or to melt butter or the like.

Referring to FIG. 2, the combination cooking cartridge 22 is shown configured as either a bake oven, a steamer or a food warmer.

Referring to FIGS. 2 and 3, to configure the combination cartridge as a bake oven, the second pan 24 is inserted into the counter 10. The heating element 26, attached sheet 27 and bracket 34 are inserted into the second pan 24. The first pan 28 is then inserted over the second pan 28. A food rack 44 is then inserted into first pan 28. The food rack 44 is constructed out of a metal or stainless steel material. The food rack 44 has a food supporting surface containing a first set of evenly spaced horizontal bars 44a, over a second set, perpendicular to the first set, of evenly spaced horizontal bars. Attached to the lower side of the food supporting surface are legs 44c which extend downwardly and attach to the first pans 28 upper surface.

To use the baker to cook food 47, food 47 is first placed on food rack 44. Cover 30 is then placed over food 47 and first pan 28. Power is applied to heating element 26, which becomes hot and heats first pan 28. First pan 28 becoming hot results in the cavity formed by the first pan 28 an cover 30 becoming hot resulting in food 47 being cooked. The temperature of the cavity is regulated by turning control knob 16c.

Referring to FIG. 3, built into the rear of counter 10 within the cooktop frame is plug 50. Heating element 26 has a connector end 45 which inserts into plug 50 to provide electricity to heating element 26.

Referring to FIGS. 2 and 4, a steaming basket 46, rather than food rack 44, may be inserted into first pan 28. The cover 30 can then be inserted over first pan to form a cavity.

The steamer basket 46 has a rectangular shape floor 58 with sides formed to fit into first pan 28. The steamer basket 46 has a top edge 54 that fits onto shelf 56. Steam basket 46 with is corresponding floor 58 is typically positioned 1"-3"above the floor of first pan 28. Steamer basket 46 also has a plurality of holes 46a, approximately ⅛" in diameter, large enough to let steam enter the cavity where the food is held but small enough not to allow food to fall through. The steamer is typically constructed from a stainless steel material.

Referring to FIG. 4, to operate the steamer, food (not shown) is placed in steamer basket 46. Water 60 is placed into first pan 28, and heating element 26 is turned on. Heating element 26 then heats first pan 28 which results in water 60 boiling and generating steam 60a. Steam 60a is then passed through holes 46a in steam basket 46, cooking food.

On the floor of the second pan 24 is hole 71. During operation, cool air enters from hole 71 and flows into the chamber 68 formed between first pan 28 and second pan 24. When heating element 26 is turned on, heat is dissipated to the air between the first pan 28 and second pan 24. The heat radiates upward to heat the first pan 28. The heated air is then dissipated outward through grooves 38 between the first pan 28 and second pan 24. Without grooves 38, hot air would be collected in chamber 68, causing first pan 28 to crack. By allowing air to dissipate upward and out through grooves 38, hot air does not collect in chamber 68 and the first pan 28 is prevented from cracking. Further, by allowing the hot air to flow along the perimeter of first pan 28, first pan 28 has a more uniform heat distribution.

During cooking operation, ventilation system 20 may be turned on. The ventilation system 20 draws a flow cool air through hole 71 into chamber 68 and across heating element 26. Air then flows out of chamber 68, up and out groove 38 and downward into ventilation system 20.

If the ventilation system 20 is turned off when the heating element 26 is turned on, cool air enters a chamber 68 through hole 71. The cool air then passes over heating element 26 and rises to heat the bottom first pan 28. Further, the hot air rises along the sides of first pan 28. Air flows through groove 38 on both sides of first pan 28. Due to the natural connection, hot air rises out of chamber 68, up along the sides of first pan 68, and out groove 38, thereby preventing cracking of first pan 28.

Referring to FIG. 2, to configure a food warmer, a dish support 74 is seated on shelf 56 of first pan 28 in place of the steamer pan 46 shown in FIG. 4. Dish support 74 is made from a plastic or metal material. One or more warming dishes is then inserted into dish support 74. Warming dishes 76 may be made from a metal, ceramic or pyrex material.

To operate the food warmer, approximately 1"-3" of water 60 is placed on the bottom of first pan 28. Heating element 26 is turned on, warming the bottom of first pan 28. The water 60 in first pan 28 is heated to a boil, thereby generating steam 60a. The rising steam 60a heats warying dishes 76, thereby waming the food (not shown).

Figure 5:
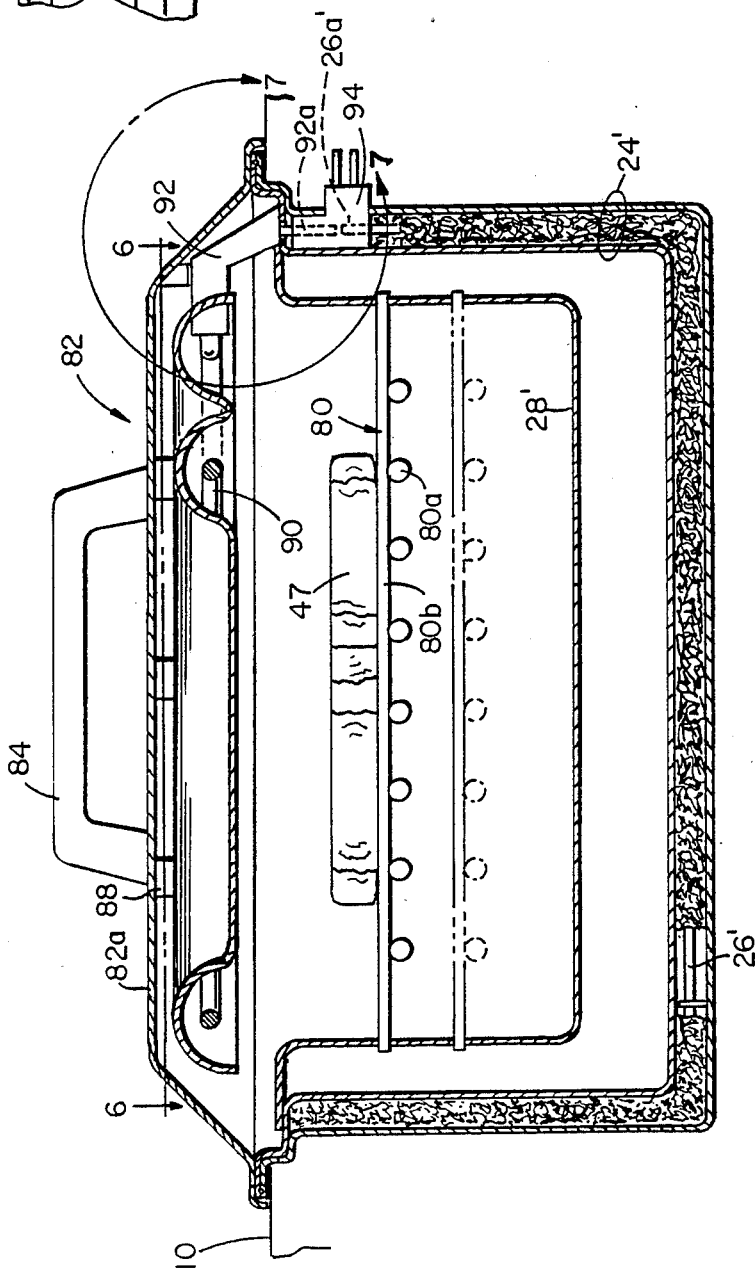
FIG. 5 is a side cross-sectional view of the broiler embodiment of the combination cooking cartridge.

Referring to FIG. 5, to configure a broiler, a second pan 24' is inserted into counter 10. The broiler is shown using an alternate embodiment of second pan 24' with the heating element 26' built in to the second pan 24'. However, the broiler can similarly be built with the second pan 24' shown in FIG. 1. Further detail of second pan 24' is explained under FIG. 8. At the ends of heating element 26' is jack 26a'. A first pan 28' is then inserted into the second pan 24'. A food holding rack 80 is then attached to the inner sides of first pan 28'. A special broiler cover 82 is then inserted over the rack 80 and first pan 28'. The first pan 28' is similar to the first pan 28 described in FIG. 2. However, the first pan 28' has a set of holes 84 in which to insert a food supporting rack 80.

The rack 80 for supporting food 47 has a first set of horizontal bars 80a supported on a second set of horizontal bars 80b, perpendicular to the first set of bars. The rack allows juice to drain between bars 80a and 80b from food 47 when the food is being cooked.

Figure 7:
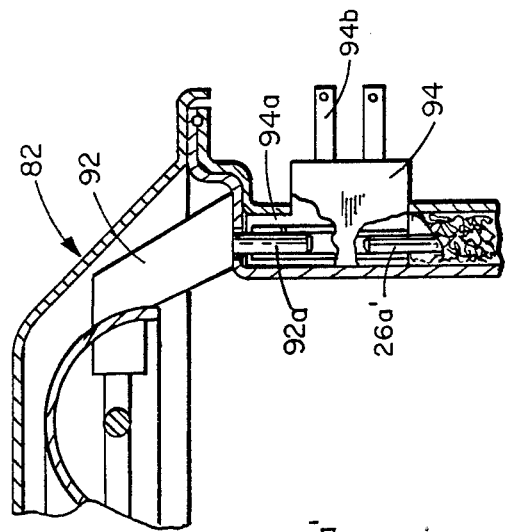
FIG. 7 is a side cross-sectional view of the connection between the broiler element and electric plug shown in FIG. 5, such view taken along line 7—7 in such FIG. 5.

Referring to FIGS. 5-7, the broiler cover 82 has a metal top 82a with a handle 84. The metal top 82a is sized to cover the first pan 28' and second pan 24'. Located under the metal top 82a is a parabolic reflector 86 shaped in a snakelike pattern. The parabolic reflector 86 is attached to the metal top with an insulated securing bracket 88. Parabolic reflector may be constructed as described in U.S. Pat. No. 4,629,865. Attached to the underside of the parabolic reflector, with a mounting bracket, is an electric heating element 90. The electric heating element 90 has a connector block 92 and jack 92a mounted at each end. Jack 92a is in electric contact with heating element 90 through connector block 92.

Built into second pan 24' is a cartridge block 94 to which electric power is distributed to either heating element 90 or heating element 26' from the control panel 16. Cartridge block 94 contains four jacks 94b in which to attach to a plug (not shown) disposed within cooktop frame 12. Two jacks distribute power for heating element 26' and the other two jacks 94b distribute power to electric heating element 90. Cartridge block 94 has a receptacle 94a in which to receive jack 92a and 26' When broiler cover 82 is placed over second pan 24', jack 92a is inserted into receptacle 94. When cover is removed, jack 92a slides out of receptacle 94. Receive jack 26a' is permanently connected to receptacle 94.

Referring to FIG. 5, during operation, electric heating element 90 is powered on. The heating element 90 then becomes hot. Heat is thus reflected downward to food 47 on food holding rack 80. The cover 82 can easily be removed during cooking. Once the cover is removed, food 47 can be turned to allow broiling on its other side.

Figure 8:
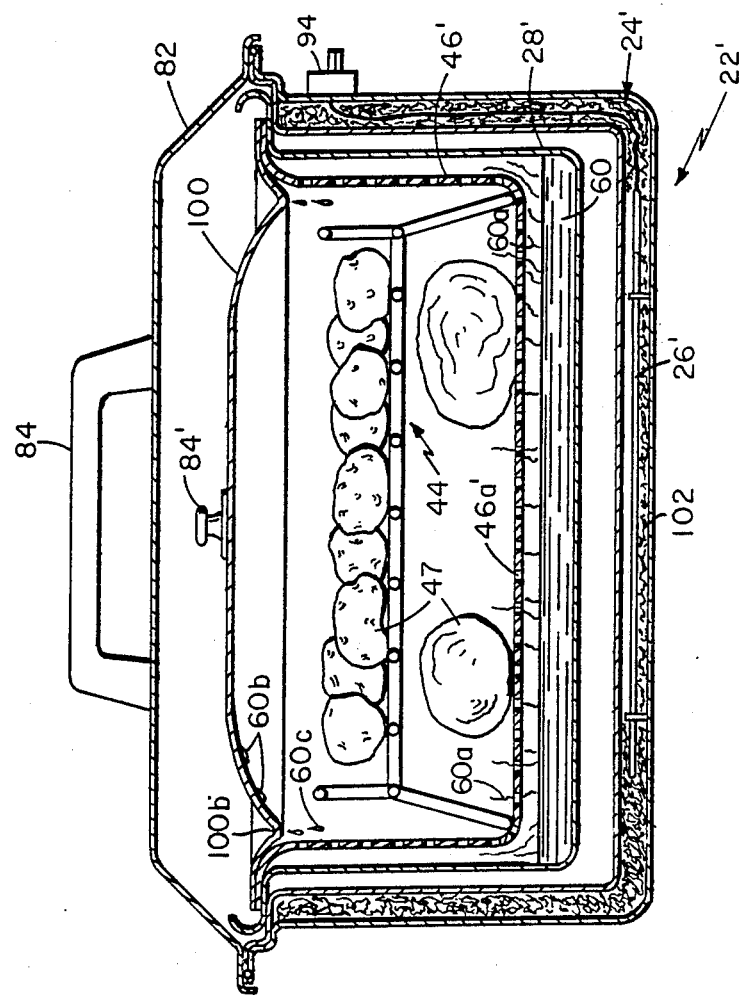
FIG. 8 is a side cross-sectional view showing a steamer version of an alternate embodiment of the combination cooking cartridge.

Referring to FIG. 8, the combination cooking cartridge 22' can alternatively be constructed with the heating element 26' constructed within the first pan 24'. This embodiment is similar to the steamer shown in FIG. 3, except this embodiment contains a specially constructed first pan 24' and a second cover 100. The first pan 24' has a top surface and a bottom surface made out of a metal material. Sandwiched between the top and bottom surface of first pan 24' is an electric heating element 26'. The bottom surface of first pan 24' is insulated 102 from the heating element 26' to prevent heat from escaping out the sides and the bottom of first pan 24'.

The heating element 26' is formed into a snakelike pattern, as described in FIG. 3. Further, the heating element 26' runs up the side of first pan 24' and exits at connector 50.

To construct a steamer, the second pan 28' is inserted into first pan 24' A steaming pan 46' is then inserted into second pan 28'. Steaming or pan 46' is supported by second pan 28'. Further, steaming pan 46' has a plurality of holes 46a' in its sides and bottom. Optionally, a rack 44' can be placed on steaming pan 46' to hold food 47.

A first cover 100 is inserted over second pan 28' and steamer pan 46'. First cover 106 contains steam 60a within steamer pan 46' and second pan 28'. A second cover 82 is placed over first cover 100 and first pan 24' to hide the first pan 24' and first cover 100 from view. Second cover 82 also has a handle 84 to allow easy removal.

To operate the steamer, the first pan 24' is filled with about 1"-3" of water 60. The heating element 26' is then turned on via control panel 16. Heating element 26' then heats second pan 28', resulting in water 60 boiling and generating steam. Steam then rises and enters the cavity within steaming pan 28' through holes 46a', thereby steaming food 47 through steaming pan 46' and rack 44'. The steam 60a continues to rise and eventually contacts first cover 100 where water vapor condenses and driplets 60b form on the cover. Due to the shape of first cover 100, the driplets 60b then slide down first cover 100 and collect on the fold on the outer periphery of the cover 100b. Water 60c then drips from the fold and falls back into second pan 28'. Due to the movement of the condensed water, driplets 60c do not fall directly onto the food 47. By having the condensed drippings 60c avoid contact with the food 47, the food 47 when cooked is less soggy.

The embodiment shown in FIG. 8 is a steamer and FIG. 5 is a broiler; however, other cartridges (see FIG. 7) can be placed into first pan 28' to configure a baker or a food warmer.

Having described a preferred embodiment of this invention, it is now evident that other embodiments incoporating its concepts may be used. It is felt, therefore, that this invention should not be restricted to such preferred embodiments but should be limited only by the spirit and scope of the appended claims.

What is claimed is:

1. An apparatus comprising:
   a counter cooktop frame having a top surface with an aperture formed therein;
   a second pan having a floor, said second pan being supported by said counter cooktop frame and extending downwardly therefrom wherein said floor of said second pan is located below said top surface;
   a heat source supported by said second pan;
   a first pan having a floor and a plurality of walls forming a cavity therein, said first pan being supported by said second pan wherein said cavity of said first pan is heated by said heat source, said first pan having an indentation on its perimeter
   covering means for covering said first pan to contain heat generated by said heat source; and
   cooling means for venting air between said first pan and said second pan wherein said cooling means comprises groove means formed between said second pan and said first pan for enabling hot air to circulate through said indentation on the perimeter of said first pan to prevent heat from building up below said first pan.

2. An apparatus for cooking food in a counter cooktop comprising:
   a counter cooktop frame having a top surface with an aperture formed therein;
   a second pan having a floor, said second pan being supported by said counter cooktop frame and extending downwardly therefrom wherein said floor of said second pan is located below said top surface;
   a heat source supported by said second pan;
   a first pan having four sides and floor forming a cavity, said first pan being supported by said second pan and forming a region therebetween;
   said floor of said first pan being in thermocommunication with said heat source wherein said cavity formed by said first pan is heated, thereby baking said food; and
   means, forming a groove between said second pan and said first pan, for venting the region between said first and second pan through said groove so as to prevent a buildup of heat below said first pan.

3. The apparatus as recited in claim 2 wherein said second pan has a floor with a hole formed therein.

4. The apparatus for cooking food in a counter cooktop as recited in claim 2 wherein said first and second pan are made out of a substantially metal material.

5. The apparatus for cooking food in a counter cooktop as recited in claim 2 further comprising a top disposed over said first pan made out of a substantially metal material; and a handle means, coupled to said top for removing said top from said first pan.

6. The apparatus for cooking food in a counter cooktop as recited in claim 2 further comprises
   an electrically resistive heating element coupled to the bottom surface of said covering means;
   directing means positioned between said heating element and said cover means for directing the heat of said heating element toward food on said rack, said directing means supporting said heating element and said directing means being coupled to the bottom of said cover means;
   insulation means between said heating element and said covering means for preventing said cover means from becoming hot;
   receptacle means coupled to said second pan for diverting power to said heat source and said electrically resistive heating element;
   plug means adapted to mate with said receptacle means and coupled to said covering means for electrically connecting said heat source to said receptacle means; and
   means for electrically connecting said heating element to said receptacle means.

7. The apparatus as recited in claim 2 further comprising ventilation means disposed adjacent said second pan for circulating air between said first and second pan through said groove.

8. The apparatus as recited in claim 7 wherein said ventilation means is mounted in said cooktop frame.

9. An apparatus for heating food in a counter cooktop comprising:

a counter cooktop frame having a top surface with an aperture formed therein, said top surface being at a first level;

a second pan, being insertable and removable from said aperture, said second pan being supported by said cooktop frame and extending downwardly therefrom, said second pan having a floor at a second level that is below said first level of said top surface, said second pan having four sides and a floor with a hole therein;

an electrically resistive heating element having a supporting bracket, said supporting bracket mounted on the floor of said second pan, said heating element generating heat when energized;

a first pan comprising four sides and a floor forming a cavity, said first pan being supported by said second pan, said outside sides of said first pan form a perimeter, said floor of said first pan being in thermocommunication with said heating element, said first pan having means for holding water wherein in response to said heating element being energized said water generates steam;

a food supporting container having a plurality of sides and being supported by said first pan wherein said container is warmed in response to said water generating steam;

groove means, formed between said second pan and said first pan for allowing air to circulate through said hole around the perimeter of said first pan and upward and out of the region between said first and second pan, to vent heat disposed below said first pan.

10. The apparatus for heating food in a counter tooktop as recited in claim 9 comprising:
means for covering said first pan to contain heat disposed within said first pan.

11. The apparatus as recited in claim 9 wherein said first and second pan are made out of a substantially metal material.

12. The apparatus as recited in claim 9 wherein said sides of said container have a plurality of small holes.

13. The apparatus as recited in claim 9 wherein said first pan is made out of a substantially ceramic material.

14. The apparatus as recited in claim 9 further comprising a sheet attached to said heating element, said sheet having a plurality of holes.

15. The apparatus as recited in claim 9 wherein said groove means is formed between a handle of said first pan and a top side of said second pan.

16. The apparatus as recited in claim 9 further comprising a means supported by said second pan for holding utensils.

17. An apparatus for broiling food comprising:
a counter cooktop frame having a top surface with an aperture formed therein;

a pan having a floor and a wall, said pan being supported by said counter cooktop frame and extending downwardly therefrom wherein said floor of said pan is located below said top surface;

a receptacle attached to said wall of said pan, and electrically connected to a power source;

covering means for covering said pan;

an electrically resistive heating element;

means, attached to said covering means for suspending said heating element below said covering means; and a plug being attached to said cover, being electrically connected to said heating element and being adapted to mate with said receptacle so as to provide power to said heating element.

18. The apparatus as recited in claim 17 further comprising supporting means contacting said pan for supporting food in an elevated position.

19. The apparatus as recited in claim 18 wherein said suspending means comprises:
means for directing the heat of said heating element toward said supporting means; and insulation means attaching said directing means to said covering means for preventing said covering means from becoming hot.

* * * * *